United States Patent [19]

Liederman et al.

[11] 3,950,491

[45] Apr. 13, 1976

[54] REACTIVATION OF AUTOMOBILE EXHAUST OXIDATION CATALYST

[75] Inventors: David Liederman, Blackwood, N.J.; Sterling E. Voltz, Media, Pa.

[73] Assignee: Mobil Oil Corporation, New York, N.Y.

[22] Filed: Mar. 27, 1974

[21] Appl. No.: 455,434

[52] U.S. Cl. ............... 423/213.5; 208/140; 252/415
[51] Int. Cl.² ...................... B01J 8/02; B01J 23/96
[58] Field of Search .......... 252/415, 441, 442, 460, 252/466 PT, 472; 423/213.5; 208/140

[56] References Cited
UNITED STATES PATENTS

| | | | |
|---|---|---|---|
| 2,906,702 | 9/1959 | Brennan et al. | 208/140 |
| 3,134,732 | 5/1964 | Kearby et al. | 252/415 |
| 3,247,128 | 4/1966 | White et al. | 252/415 |
| 3,551,516 | 12/1970 | Ashley et al. | 252/441 |

FOREIGN PATENTS OR APPLICATIONS

| | | | |
|---|---|---|---|
| 744,357 | 10/1966 | Canada | 252/415 |

Primary Examiner—Patrick P. Garvin
Assistant Examiner—P. E. Konopka
Attorney, Agent, or Firm—C. A. Huggett; R. W. Barclay; S. A. Strober

[57] ABSTRACT

Oxidation catalysts containing platinum or other noble metal components used in automobile exhaust emission control are reactivated, after thermal deactivation, by subjecting the catalyst to a halogen-containing gas at a temperature of from 500°F. to about 1000°F. The passing of carbonyl halide or a mixture of carbon monoxide and halogen, alone or in a carrier gas, over the catalyst reduces the CO-oxidation and hydrocarbon-oxidation temperature to almost that of fresh catalyst. Carbonyl chloride or the carbon monoxide-chlorine mixture is preferred. This treatment may also be used in the reactivation of noble metal-containing reforming catalysts.

9 Claims, No Drawings

REACTIVATION OF AUTOMOBILE EXHAUST OXIDATION CATALYST

BACKGROUND OF THE INVENTION

1. Field of the Invention

This invention relates to a method of reactivating an automobile exhaust oxidation catalyst and particularly to the reactivation of a noble metal catalyst with a halogen-containing material.

2. Description of the Prior Art

U.S. Pat. No. 3,134,732 describes a method of reactivating a platinum hydroforming catalyst, platinum on alumina, by contact with oxygen to burn off deposits, then with gaseous halogen to reduce platinum crystallites, followed by reduction of the halogen content with hydrogen. The hydroforming function involves treatment of naphtha stock in the presence of hydrogen. Maximum temperature in hydroforming is usually only 1050°F. U.S. Pat. No. 2,906,702 also describes the use of halogen to reactivate platinum hydroforming catalyst. This process is similar to the first except the halogen is washed out with water. However, none of these references discloses the reactivation of thermally deactivated noble metal catalysts which have been exposed to extremely high temperatures for prolonged periods, nor the reactivation of noble metal catalysts used for oxidation, and more specifically, automotive exhaust gas oxidation.

SUMMARY OF THE INVENTION

A deactivated catalyst containing a noble metal component used in oxidizing carbon monoxide and hydrocarbons in exhaust gas of automobiles at temperatures above 1100°F is reactivated by subjecting the catalyst to a carbonyl halide or a mixture of carbon monoxide and halogen gas at an elevated temperature.

DESCRIPTION OF SPECIFIC EMBODIMENTS

The catalysts treated in this invention are noble metal catalysts. There are many methods of preparing the catalyst, for example, impregnation of a carrier structure with solutions containing chloroplatinic acid or platinum-(ammine) halides. They are used to catalyze the oxidation of CO and hydrocarbons usually at temperatures of about 1000° to 1400°F., but often subject to thermal exposures at from 1500° to 2400°F. Such temperatures, not normally encountered in catalytic hydrocarbon conversion processes, such as hydroforming, frequently prevail in exhaust systems in which catalytic converters must operate. The catalysts employed in this invention consist of a metal component containing platinum, palladium, rhodium, osmium, iridium, or the like usually supported on alumina, silica, magnesia, zirconia, and other suitable catalyst supports and mixtures thereof. The support for the noble metal catalysts treated in this invention does not affect the carrying out of the method. The preferred noble metals in this invention are platinum, palladium, and platinum-palladium and platinum-rhodium.

Reactivation may be carried out by treating the catalyst with carbonyl halide or a mixture of carbon monoxide and halogen gas. It is believed that the mixture may combine over the heated surface of the catalyst to produce the carbonyl halide in situ according to the equation

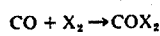

X being halogen, preferably chlorine or bromine. While not wishing to be limited to a particular mechanism of reactivation, it is theorized that the noble metal, e.g. platinum, forms a metal(carbonyl halide) complex compound, such as platinum carbonyl chloride. Such compounds may be redistributed over the surface of the carrier material to provide a greater catalytic surface area.

The pre-reacted carbonylhalide may be applied alone, as 100% gas, or with a carrier gas, such as nitrogen, helium, or carbon dioxide, in a concentration of at least about 0.25% by volume, and preferably at least 1% by volume. The temperature of this treatment is in the range of between 400°F. and 1100°F., preferably from 500° to 800°F. If a mixture of the reactants is used, the amounts of each gas need not be stoichiometric. Excess carbon monoxide may be present in the reactivation zone. Alternatively, excess halogen may be present; it is believed that a carbonyl halide-halogen gas mixture may be formed to effect reactivation. The ratio of carbon monoxide to halogen may range from 0.25 to 2:1 v/v.

The gas may be applied to the catalyst either in a flowing gas stream or in a static carbonyl halide atmosphere. The catalyst may be removed from the catalytic converter chamber for this treatment or the gas may be applied directly to the chamber without removal from the automobile if the chamber design permits. Either alternative may be followed for convenience.

The use of carbonyl halides either pre-reacted or formed in situ from carbon monoxide and halogen-supplying material may also be applied to the reactivation of noble metal catalysts for reforming operations. These catalysts usually contain platinum alone or platinum with other metals, such as rhenium, supported on a refractory material, such as alumina or silica-alumina. The same conditions for reactivating automobile exhaust catalysts can be applied in reactivating these reforming catalysts except the preferred temperature range is from 400° to 900°F.

EXAMPLES

In the following examples, the catalyst is evaluated by the oxidation of CO and hydrocarbons to $CO_2$ and water. The temperature necessary to achieve 50% conversion of CO and hydrocarbons is a measure of effectiveness; the lower this temperature, the more active the catalyst.

In the testing of the automobile exhaust catalyst, an exhaust feed consisting of carbon monoxide, oxygen, mixed hydrocarbons (HC), carbon dioxide, water, and nitric oxide is produced by running a 2-cylinder 4-cycle engine on unleaded gasoline. The feed is adjusted to contain the following component mixture:

| Component | Mole % |
|---|---|
| CO | 2 |
| $O_2$ | 4.5 |
| HC | 350 ppm |
| $CO_2$ | 10 |
| $H_2O$ | 10 |
| NO | 300 ppm |
| Nitrogen | Remainder | by passing individual gases into the feedstream. When the above mixture is achieved, the feed is passed into the catalytic converter. The converter is equipped with a furnace to bring reaction temperature to the desired range. The initial contact temperature is 200°F. while the reactant mixture is passed over the catalyst at a space velocity (by volume) of 20,000 hr.$^{-1}$. The furnace temperature is then increased incrementally (about 10° to 50°F.-increments) and the CO and HC conversions are determined at each temperature level. Samples of reaction gases are removed for each analysis, CO by non-dispersive infrared analyzers, the HC by flame ionization detectors. The temperature at which 50% of the initial CO and HC are converted (to carbon dioxide and water) is one basis for showing the advantages of the method of this invention.

EXAMPLE 1

A sample of a commercial monolithic platinum catalyst with aluminum washcoat (PTX-4, a product of Engelhard Industries), was deactivated by heating in air at 1800°F. for 24 hours and at 1000°F. for 68 hours. The catalyst was tested for conversion of CO and HC at various temperatures. The catalyst was then heated in a tube furnace having a gas inlet and outlet at 500°F. and a 50—50 (v/v) mixture of carbon monoxide and chlorine was passed through the furnace for one hour. The catalyst from this treatment was also tested. The results were as follows:

| Fresh Catalyst | | | Deactivated Catalyst | | | Treated Catalyst | | |
|---|---|---|---|---|---|---|---|---|
| Gas Inlet Temperature °F. | Conversion, % CO | HC | Gas Inlet Temperature °F. | Conversion, % CO | HC | Gas Inlet Temperature °F. | Conversion, % CO | HC |
| 330 | 2 | 0 | 540 | 3 | 0 | 480 | 3 | 0 |
| 350 | 4 | 0 | 560 | 9 | 1.2 | 490 | 10 | 0 |
| 360 | 6 | 0 | 580 | 64 | 36 | 500 | 98 | 78 |
| 370 | 10 | 0 | 590 | 91 | 66 | 520 | 98 | 78 |
| 380 | 13 | 1.3 | 600 | 93 | 71 | 550 | 98 | 90 |
| 390 | 20 | 4.1 | 620 | 96 | 75 | | | |
| 400 | 98 | 84 | 650 | 98 | 80 | | | |
| | | | 700 | 98 | 80 | | | |

These results show that 98% conversion of CO is achieved at 500°F. and 90% conversion of hydrocarbons at 550°F., a considerable improvement over the deactivated catalyst.

EXAMPLE 2

A fresh sample of the catalyst was deactivated by heating in air at 1800°F. for 24 hours. The catalyst was tested for conversion of CO and HC, and then treated with 100% carbonyl chloride for one hour at 500°F. The catalyst was tested again with the following results:

| Catalyst Conditions | Temp., °F. Required For 50% Conversion | |
|---|---|---|
| | CO | HC |
| 1. Fresh | 395 | 395 |
| 2. After 25 hrs. at 1800°F. in air | 570 | 570 |
| 3. After (2) and 1 hour at 500°F. in 100% | | |

| Catalyst Conditions | Temp., °F. Required For 50% Conversion | |
|---|---|---|
| | CO | HC |
| COCl$_2$ | 465 | 465 |

EXAMPLE 3

About 10 grams of a deactivated reforming catalyst consisting of about 0.5% of a platinum on alumina is placed in the tube furnace of Example 1 and heated to a temperature of 500°F. Through the gas inlet is passed a stream of 100% carbonyl chloride at atmospheric pressure for a period of one hour. The resulting catalyst is reduced in hydrogen gas at 600°F.

This invention has been described in both broad and narrow terms. Obvious modifications of specific aspects of this invention are intended to be included in the scope hereof.

Having described our invention, we claim:

1. A method of using and reactivating an automobile exhaust catalyst containing a noble metal supported on a carrier therefor comprising the steps of (1) oxidizing the carbon monoxide and hydrocarbons in the said automobile exhaust in the presence of the said catalyst at temperatures above 1100°F. in air for a prolonged period of time thereby thermally deactivating the said catalyst and (2) reactivating the catalyst by placing the catalyst in a flowing stream or in a static atmosphere of a gas selected from the group consisting of a carbonyl halide alone or in admixture with a carrier gas from the group consisting of helium, carbon dioxide and nitrogen, and a mixture of carbon monoxide and halogen at a temperature in the range of between 400° and 1100°F.

2. The method of claim 1 wherein the temperature of the gas treatment is in the range of from 500°F. to 800°F.

3. The method of claim 1 wherein the gas is a carbonyl halide.

4. The method of claim 3 wherein the gas is carbonyl chloride.

5. The method of claim 1 wherein the carbonyl halide is applied in said gas admixture at a concentration of at least 0.25% by volume.

6. The method of claim 1 wherein the gas is initially a mixture of carbon monoxide and halogen.

7. The method of claim 6 wherein the halogen is chlorine and carbonyl chloride forms at the catalyst surface.

8. The method of claim 1 wherein the gas is applied as a flowing stream.

9. The method of claim 1 wherein the noble metal is platinum.

* * * * *